S. B. SPAULDING.
Reservoir Cooking Stove.
No. 2,291. Reissued June 19, 1866.
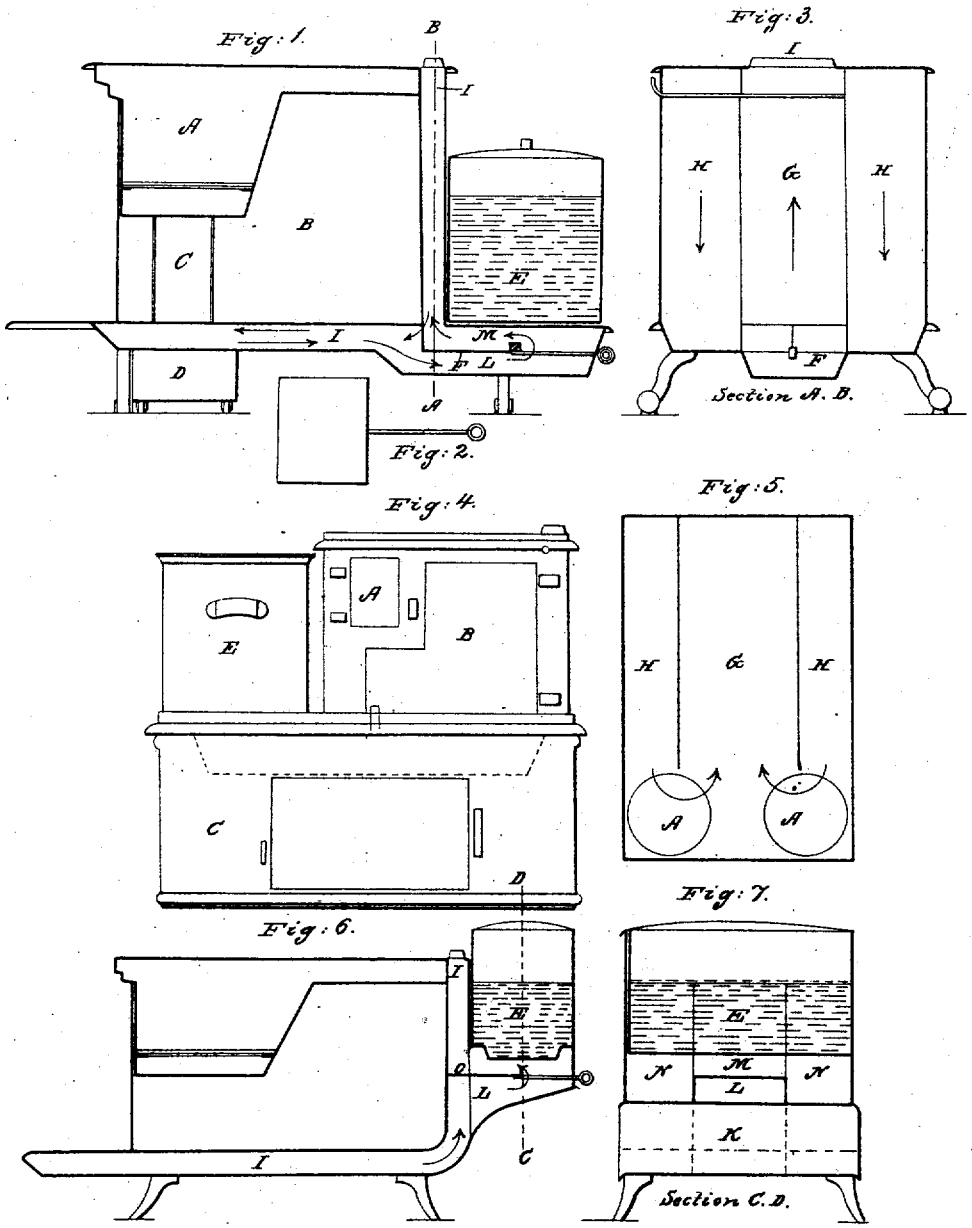
Witnesses:
Henry T. Munson.
George A. Nolen
Inventor:
Samuel B. Spaulding.
By Marcus P. Norton.
Atty.
N. PETERS, Photo-Lithographer, Washington, D. C.

UNITED STATES PATENT OFFICE.

DANIEL E. PARIS, OF TROY, NEW YORK, ASSIGNEE, BY MESNE ASSIGNMENTS, OF SAMUEL B. SPAULDING.

IMPROVEMENT IN COOKING-STOVES.

Specification forming part of Letters Patent No. 20,668, dated June 22, 1858; additional improvement May 17, 1859; Reissue No. 2,291, dated June 19, 1866.

*To all whom it may concern:*

Be it known that SAMUEL B. SPAULDING, of Brandon, in the county of Rutland and State of Vermont, did on the 22d day of June, A. D. 1858, obtain Letters Patent upon certain new and useful improvements in cooking-stoves, and bearing the title of Improvement in Cooking-Stoves; and also that the said SAMUEL B. SPAULDING, after the issue of said Letters Patent, added to the same, in due form of law, a description of an additional invention, which was annexed to and included in said Letters Patent, which Letters Patent have been duly assigned to DANIEL E. PARIS, of the city of Troy, county of Rensselear, and State of New York, by which assignment the said DANIEL E. PARIS has become and is the true and lawful owner of the same, and his entire interest to said invention, improvements, and patent; and I, the said DANIEL E. PARIS, assignee of said patent, do hereby declare that the following is a full, clear, and exact description of the said invention and improvements, reference being had to the accompanying drawings, and to the letters of reference marked thereon, which drawings are a part of this specification.

Like letters represent and refer to like or corresponding parts.

Figure 1 is a sectional view of a cooking-stove containing my invention or improvement for heating a reservoir or water-tank back of the stove. Fig. 2 is a view of the damper which regulates the admission of the heat beneath and against the reservoir, as hereinafter set forth. Fig. 3 is a view of a section of said stove along the red line A B, Fig. 1. Fig. 4 is a sectional view of a cooking-stove with my invention and improvements for conducting the heat under the hearth in front of the stove. Fig. 5 is a horizontal view of the stove shown in Fig. 4 with the fire-box and oven removed, and showing the manner in which the heat is conducted under the hearth, as hereinafter described. Fig. 6 is a modification containing said improvements applied to the back of the stove, substantially as herein described and set forth. Fig. 7 is a section of Fig. 6 along the red line C D.

The nature of said invention consists in extending the flues of a square-shaped or diving-flue cooking-stove so as to conduct the heat and products of combustion under the bottom of a reservoir or water-tank and against the same, previous to the escape of the said heat and products of combustion into the exit-pipe, when the whole or a part of the reservoir is below the surface of the stove and in rear of the back flues thereof, substantially as hereinafter described.

It also consists in the employment, in a cooking-stove, of a return flue so constructed that it will conduct the heat and products of combustion under the bottom of a reservoir and against the same, and thence back to the exit-pipe, when the whole or a part of the reservoir is situated below the top of the stove and in the rear of the back flue or flues thereof, substantially as hereinafter described and set forth.

It also consists in the arrangement of a damper so arranged and operated that the heat and products of combustion will pass under the bottom of the said reservoir and against it, and thence into the exit-pipe, or will pass directly into the exit-pipe by a proper adjustment, substantially as hereinafter described.

It also consists in extending the flue or flues of a common cooking-stove under the hearth in front of the stove, substantially in the manner hereafter described and set forth.

It also consists in the formation and arrangement of an aperture or opening—one or more, and of any required and convenient size or capacity—in and through the rear or back outer and vertical end plate of the stove, and which forms the end vertical flue or flues between such plate and the back-end oven-plate of the stove and the bottom flue or flues directly under the oven, so as to permit and allow the heat or heated air or escaping products of combustion to pass therefrom through such aperture or opening, and thereafter come upon and in contact with the reservoir or water-tank, and thus and thereby warm or heat to any required degree the water within said reservoir or water-tank.

It also consists in the arrangement of a plate or chamber projecting in a horizontal direction outward from the rear or back end of the stove, and constructed with openings or a hole of any desired capacity and in the top thereof, and which shall be below the top-plate of the stove, so as to receive said reservoir or water-tank, while the bottom of such reservoir shall of itself form and make the covering of such plate or chamber containing such openings or hole, and thereby complete the hot-air chamber immediately below such plate, and at the same time the aforesaid reservoir or water-tank may form a part of the outer casing of the rear flue or flues, if deemed best so to do in order to carry out more fully and perfectly the invention aforesaid and herein described and set forth.

It also consists in the construction and arrangement of a warming or hot-air chamber or closet under the bottom flue or flues, immediately below the oven of the stove and extending down to the floor, and having the aforesaid bottom flue or flues of said oven projecting downward to any required distance into such chamber or hot-air closet in such manner as to more quickly and thoroughly heat the said closet or chamber for the purpose of warming or keeping warm such things as may be placed therein for that purpose, and also for drying any and all kinds of fruits, as may be desirable, and which, being so constructed, shall constitute the foundations whereon such stove shall rest or be supported in the manner substantially as hereinafter described and set forth.

To enable others skilled in the art to which said invention and improvements relate to make and use the same I will here proceed to describe the construction and operation thereof, which is as follows, to wit: A, Fig. 1, represents the fire-box of a cooking-stove; B, the oven; C, the passage from the fire-box to the ash-box; D, the ash-box, which is separate from the stove and placed on rollers for convenience in removing the ashes. E is a reservoir or water-tank placed in the rear and below the top of the stove. I is the exit-flue of the stove, and J the middle flue, extending under the oven.

In a stove constructed according to said invention I extend the middle flue, J, beyond the back of the stove to a distance equal to the width of the reservoir, which may be supported over said flue either by extending the bottom of the stove for that purpose, as in Fig. 1, or by attaching the reservoir to the back of the stove over such flue, substantially as shown in Figs. 6 and 7. In the said extended flue I place the sliding plate or damper F, of the same width as the flue, and which extends from side to side thereof.

It will be seen that when the damper F is pushed in the entrance from the middle flue, J, to the exit-pipe I is closed, and the heat and products of combustion are conducted under the damper F, through the space L, to the bottom of the reservoir E, and against it, and back over the damper, through the space M, to the exit flue I. The course of the draft is indicated by the arrows in Figs. 1 and 6. This course is also shown in Fig. 3, where H H represent the side or diving flues of the stove, and G the middle or exit flue, the arrows showing the direction of the draft. The advantages of this arrangement are that by the use of the damper the water in the reservoir may be heated or not at pleasure, and without interfering in the least with the other operations of the stove.

Figs. 6 and 7 show a modification of said invention and improvement, presenting substantially the same features as are shown in Fig. 1, except that the reservoir, instead of being supported over the extended flue by an extension of the bottom of the stove alone, is attached to or sits upon an outward projection or extension of the vertical flue or flues of the back end of the stove, constructed for that purpose.

A, Fig. 4, represents the fire-box, and B the oven, of a three-flue cooking-stove. I construct the flues under the oven, so that they pass under the hearth, as is shown in Fig. 5, which represents the horizontal flues of the stove, H H being the side, and G the middle flue. The heater may have boiler-holes, if desired, as at A A. The arrows show the direction of the draft. By placing a boiler, E, on one of the holes A, Fig. 2, the waste heat from common cooking will pass under the boiler and against it, and the same will be more or less heated, according to the amount of fuel used for other purposes. This arrangement of the flues and hearth renders it very convenient to warm water, or to keep dishes warm over the hearth while others are cooking on the top of the stove, and it is an important consideration that there is no extra expense from the consumption of fuel.

I construct and arrange the aforesaid hot-air closet or chamber C immediately under said stove, between the said bottom flue or flues and the floor of the room where said stove is to be used, and of any capacity which may be deemed desirable. The outside casing or plates thereof, which form the sides and ends, may be made of cast or sheet iron, or of tin or other suitable material, the lower edge whereof will rest down and upon the floor of the room where such stove is used, while upon the upper edge thereof will rest and remain the said stove, while the bottom flue or flues, *x*, underneath the said oven, will project downward somewhat into such closet or hot-air chamber, substantially as seen at *x*, Fig. 4, in dotted lines; so thus a hot closet or chamber for warming or drying is constructed and completed of considerable value and utility. The sides and ends of such closet or chamber may be ornamented with any design or configuration which may be deemed suitable. The corners of said surrounding casing, by which said closet or chamber is constructed, may be bolted, riveted, soldered, or otherwise put together by any suitable means.

I wish it distinctly understood that the said aperture, hole, or opening L M may be of any suitable and convenient size, form, or shape, and it may be put into any part or place of the aforesaid back-end vertical plate of said stove, which forms and makes complete the said vertical flue or flues of such stove, which may be considered more suitable and convenient for the purposes hereinbefore stated and set forth.

The said aperture or opening is in and through said plate, at or near the lower part thereof, or at any other place or point between the bottom and top thereof as may be deemed desirable, for the sole and express purpose of conducting the heat, hot air, or escaping products of combustion into a suitable chamber or space underneath or surrounding the lower part of said reservoir or water-tank, so that such heat thus admitted shall come in direct contact with the bottom or other exposed portions of said reservoir or water-tank, as the case may be, when such water-tank or reservoir is arranged in whole or in part below the top of the cooking-stove, and thus and thereby heat the water therein contained to any degree of heat desired and for any purpose required.

It is quite manifest that the invention aforesaid may be applied to any and all kinds of cooking-stoves, irrespective of the kind or number of flues which the same may contain, without in the least changing the main features or character of the same. I have, however, deemed it best to show in the accompanying drawings a common three-flue cooking-stove.

It will now here be observed that the aforesaid aperture or opening in the said vertical and back or rear end plate may be of any form, size, or capacity required in order to carry out the main object or purpose of said invention and improvements, and the same will be seen and better understood by reference to and inspection of the accompanying drawings at L and M, Figs. 3, 6, and 7.

It will then be seen that the aforesaid aperture or opening is constructed in and through said vertical rear-end plate of the stove, and for convenience is made below the center line of such plate and communicating with the center flue, because there are three flues represented in said drawings, to wit: H, G, H; but if only one horizontal and vertical flue were shown, and that a broad or sheet flue, then the aforesaid aperture or opening might, if deemed best so to do, extend the full width of the said stove, and in height to any desirable point in the said back or end vertical plate, and thus and thereby carry out the real and substantial features and object of said invention and improvements, as hereinbefore described and set forth. Nor is it at all essential or material as to what exact or precise point in the said vertical and external end plate said aperture, opening, or openings is or are made so long as the heat passes through the same and in any manner whatever, and thereafter come in contact with said reservoir or water-tank, or any portion thereof, in the manner and for the purposes substantially aforesaid. The heat passing through such aperture or opening or openings, for the purposes substantially as aforesaid, will in all cases be regulated and governed by a damper suitably constructed and arranged for the purposes herein described and set forth. It will be located and operated in accordance to the location of and in combination with the aforesaid aperture, opening, or openings in and through the said vertical rear or end plate, as aforesaid described and set forth.

It is also manifest that the aforesaid outward projection, containing the hot-air chamber herein described, and upon which the said reservoir or water-tank is placed and supported, with the whole or part thereof below the top plate of the cooking-stove, or any substantial and material equivalent thereof, may be of any size, shape, or capacity which will answer the purposes aforesaid, and it may be cast with or attached to the said stove in any way or by any mechanical means deemed best to use, and without changing in any way or manner the improvements aforesaid.

By the arranging of the said reservoir or water-tank upon the immediate rear end of such stove, and with the same in part or entirely below the top plate of the stove, and in bringing the heat aforesaid into direct and positive contact with any part or portion of such reservoir or water-tank, by the means of the removing of a part or portion of the said outward vertical end plate of the stove, substantially as herein described and set forth, there will be very great economy in the use of fuel for the heating of water in large quantities for washing or for other purposes, and at the same time obtain that degree of heat to such water often desirable and not heretofore obtained by other reservoirs or water-tanks used prior to the making of the invention and improvements herein described and set forth, and which were fully shown in and by the drawings attached to the original patent, dated as aforesaid.

There are other modifications of the said invention and improvements which I have not deemed essential to herein describe, as all the material and more important features of said invention are easily understood by the reading of this specification and claims and an inspection of the accompanying drawings.

The said reservoir or water-tank E may be constructed of any size or shape, and of any suitable material which will answer the required purposes, and conform to size, form, or shape of the said rear vertical end plate in and through which such aperture, opening, or openings are formed or constructed, as aforesaid, and wherever it rests upon or against and covers any aperture or opening, as hereinbefore described and set forth, it will be so made as to closely fit the same and thereby prevent the escape of any smoke or waste of heat or of other products of combustion into the room where such stove is being used.

Having thus described the construction and operation of the original invention of said SAMUEL B. SPAULDING, what I claim as his invention and improvement is—

1. The extending of one or more of the flues of a square-shaped or diving-flue cooking-stove so as to conduct the heat and products of combustion under the bottom of a reservoir or water-tank and against it before the same passes into the exit-pipe, when the said reservoir is placed wholly or partly below the top of the stove and in rear of the back flue or flues thereof, substantially as herein described and set forth.

2. A return flue so constructed that the heat will be conducted under the bottom of a reservoir or water-tank, and thence back to the exit flue or pipe, and when the whole or a part of the reservoir is placed below the surface of the stove and in rear of the back flue or flues thereof, substantially as herein described and set forth.

3. The damper F, so arranged and operated as to throw the heat and products of combustion under the reservoir E and against it, or by a proper adjustment or change of position thereof to allow the same to pass directly into the exit-flue I, substantially as herein described and set forth.

4. Constructing the flues which pass under the oven of a cooking-stove in such a manner that the heat and products of combustion will pass under the hearth in front of the stove, substantially in the manner and for the purposes herein described and set forth.

5. The hot-air chamber projecting out from and situated immediately in the rear end of the stove and back of the flue or flues connected therewith by means of an aperture or opening in and through the rear end and vertical plate of the cooking-stove, so as to permit or allow the heat or heated air or escaping products of combustion to pass through the same into such chamber or its equivalent, and thereafter come in direct contact with the reservoir or water-tank, arranged for the purposes substantially as aforesaid.

6. An open seat or outward-projecting chamber which shall receive and contain said reservoir or water-tank, and formed on the back end of a cooking-stove, so that such reservoir shall itself form the covering or a part of the outer casing of the rear flue or flues, and of the said hot-air chamber, combined and just below the same, in the manner substantially as herein described and set forth.

7. The arrangement of an aperture, opening, or openings constructed in and through the rear vertical end plate of the stove, so that the heat, hot air, or escaping products of combustion may by the means thereof come in positive contact with the bottom or other exposed parts or portion of said reservoir or water-tank, and thereby heat or warm the water therein, substantially as herein described and set forth.

8. The arrangement of a reservoir or water-tank with the whole or part thereof sustained or supported, substantially as herein described and set forth, in combination with an aperture or opening or openings in and through the rear vertical end plate of said stove, for the purposes substantially as herein described and set forth.

9. The arrangement of a hot-air or warming or drying chamber or closet directly underneath the bottom of the cooking-stove, in combination with the downward-projecting bottom X of the horizontal flue or flues of the stove into such chamber or closet, in the manner and for the purposes substantially as herein described and set forth.

10. The suspending and supporting of a cooking-stove, without the use of the ordinary legs, upon the surrounding casing or box C, which forms the hot-air or drying chamber or closet, between the same and the floor, substantially as herein described and set forth.

In testimony whereof I have on this 27th day of April, 1866, hereunto set my hand.

DANIEL E. PARIS.

Witnesses:

CHARLES D. KELLUM,
R. H. REILLEY.